US009098350B2

(12) United States Patent
Gedik et al.

(10) Patent No.: US 9,098,350 B2
(45) Date of Patent: Aug. 4, 2015

(54) ADAPTIVE AUTO-PIPELINING FOR STREAM PROCESSING APPLICATIONS

(71) Applicant: International Business Machines Corporation, Armonk, NY (US)

(72) Inventors: Bugra Gedik, White Plains, NY (US); Scott A. Schneider, White Plains, NY (US); Yuzhe Tang, Atlanta, GA (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 13/669,968

(22) Filed: Nov. 6, 2012

(65) Prior Publication Data

US 2014/0101668 A1   Apr. 10, 2014

Related U.S. Application Data

(63) Continuation of application No. 13/648,923, filed on Oct. 10, 2012, now abandoned.

(51) Int. Cl.
*G06F 9/46* (2006.01)
*G06F 9/50* (2006.01)

(52) U.S. Cl.
CPC .............. *G06F 9/5083* (2013.01); *G06F 9/505* (2013.01); *G06F 2209/508* (2013.01); *G06F 2209/5022* (2013.01)

(58) Field of Classification Search
None
See application file for complete search history.

(56) References Cited

U.S. PATENT DOCUMENTS

| 7,961,194 | B2 | 6/2011 | Bakalash et al. |
| 8,108,845 | B2 | 1/2012 | Little et al. |
| 8,108,863 | B2 | 1/2012 | Rakvic et al. |
| 8,117,620 | B2 | 2/2012 | Raghunath et al. |
| 2009/0077561 | A1 | 3/2009 | Feng et al. |
| 2011/0041132 | A1* | 2/2011 | Andrade et al. ............ 718/102 |
| 2011/0219208 | A1 | 9/2011 | Asaad et al. |

FOREIGN PATENT DOCUMENTS

WO   2012019111   2/2012

OTHER PUBLICATIONS

Simmhan et al., "Adaptive Rate Stream Processing for Smart Grid Applications on Clouds," Proceedings of the 2nd International Workshop on Scientific Cloud Computing, ACM NY 2011.

(Continued)

*Primary Examiner* — Kenneth Tang
(74) *Attorney, Agent, or Firm* — Cahn & Samuels, LLP (57) ABSTRACT

An embodiment of the invention provides a method for adaptive auto-pipelining of a stream processing application, wherein the stream processing application includes one or more threads. Runtime of the stream processing application is initiated with a stream processing application manager. The stream processing application is monitored with a monitoring module during the runtime, wherein the monitoring of the stream processing application includes identifying threads in the stream processing application that execute operators in a data flow graph, and determining an amount of work that each of the threads are performing on operators of the logical data flow graph. A processor identifies one or more operators in the data flow graph to add one or more additional threads based on the monitoring of the stream processing application during the runtime.

16 Claims, 5 Drawing Sheets

(56) References Cited

OTHER PUBLICATIONS

Turaga et al., "Design principles for developing stream processing applications," Softw. Pract. Exper. 2010; 40:1073-1104 Published online Aug. 24, 2010 in Wiley Online Library (wileyonlinelibrary.com).

Oracle, "Oracle Streams Performance Tuning Best Practices: Oracle Database 10g Release 10.2," An Oracle White Paper, Nov. 2008.

* cited by examiner

ADAPTIVE AUTO-PIPELINING FOR STREAM PROCESSING APPLICATIONS

This patent application is a continuation application of U.S. patent application Ser. No. 13/648,923 filed on Oct. 10, 2012, which is hereby incorporated by reference.

BACKGROUND

The present invention is in the field of methods, systems, and computer program products for adaptive auto-pipelining for stream processing applications.

Processing within a data processing system can include various forms, including non-stream processing and stream processing. In non-stream processing, data is received, saved and later processed. In contrast, in stream processing, data is processed, as it is continuously received.

Examples of stream processing systems include large scale sense-and-respond systems, which continuously receive external signals in the form of one or more streams from multiple sources. Examples of such systems abound, ranging from systems deployed for monitoring and controlling manufacturing processes, power distribution systems, and telecommunication networks, to environmental monitoring systems, to algorithmic trading platforms, etc.

SUMMARY OF THE INVENTION

An embodiment of the invention provides a method for adaptive auto-pipelining of a stream processing application, wherein the stream processing application includes one or more threads. Runtime of the stream processing application is initiated with a stream processing application manager. The stream processing application is monitored with a monitoring module during the runtime, wherein the monitoring of the stream processing application includes identifying threads in the stream processing application that execute operators in a data flow graph, and determining an amount of work that each of the threads are performing on operators of the logical data flow graph.

The monitoring can further include measuring performance of the stream processing application to determine if a previous optimization process increased the performance of the stream processing application relative to a previous time period of execution of the stream processing application. The previous optimization step can include adding one or more threads to the stream processing application and/or removing one or more threads from the stream processing application.

A processor identifies one or more operators in the data flow graph to add one or more additional threads based on the monitoring of the stream processing application during the runtime. In another embodiment, the processor identifies one or more threads to remove from the stream processing application based on the monitoring of the stream processing application during the runtime.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Example, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides methods and systems for adaptive auto-pipelining for stream processing applications. Additional threads are added into a stream processing application at run-time, based on observed resource usage of the stream processing application and its reaction to the insertion of additional threads. The application developer codes up the data flow graph without considering pipelined parallelism explicitly. At run-time, a continuous profiling and optimization process is used that will determine the number of locations in the flow graph where additional threads can be used to improve performance. These threads are then added without affecting the stream processing application's correctness. Based on the feedback collected at runtime, the process can continue to add additional threads or remove them, to maximize the throughput. The process is adaptive, in the sense that if there are more resources available, it can take advantage of it. The process has the advantage that it is transparent to the developers. It will optimize the system without any additional effort from the developers.

An embodiment of the invention works based on a four step control process executed at run-time. This process consists of profiling, evaluation, optimization, and thread injection. At run-time, the stream processing application is profiled to understand what threads are being used and how much work they are performing on different parts of the data flow graph. As part of the profiling step, the performance of the application can also be measured to see if the last optimization step (if there was one) helped by improving performance. If it did not help, the last action can be taken back (the previously added threads are removed). If it did help, the process continues on to the optimization step.

During the optimization step, the profiling information is used to locate one or more locations in the data flow graph where the addition of additional threads is expected to improve the performance. In one embodiment, the following guiding principles are used to achieve this: threads that are highly utilized are selected to offload some of their work to the newly added thread(s). For each highly utilized thread, there can be one new thread that takes work away from it, even though a newly created thread can take away work from multiple existing threads. In at least one embodiment, the work offloading is performed such that the highly loaded threads offload half of their work as much as possible, so as to rate-match the workflows across the old and the newly created thread(s). Techniques are also provided to efficiently profile threads executing in data flow graphs, as well as techniques to efficiently perform thread-injection on a running stream processing application.

Figure 1:
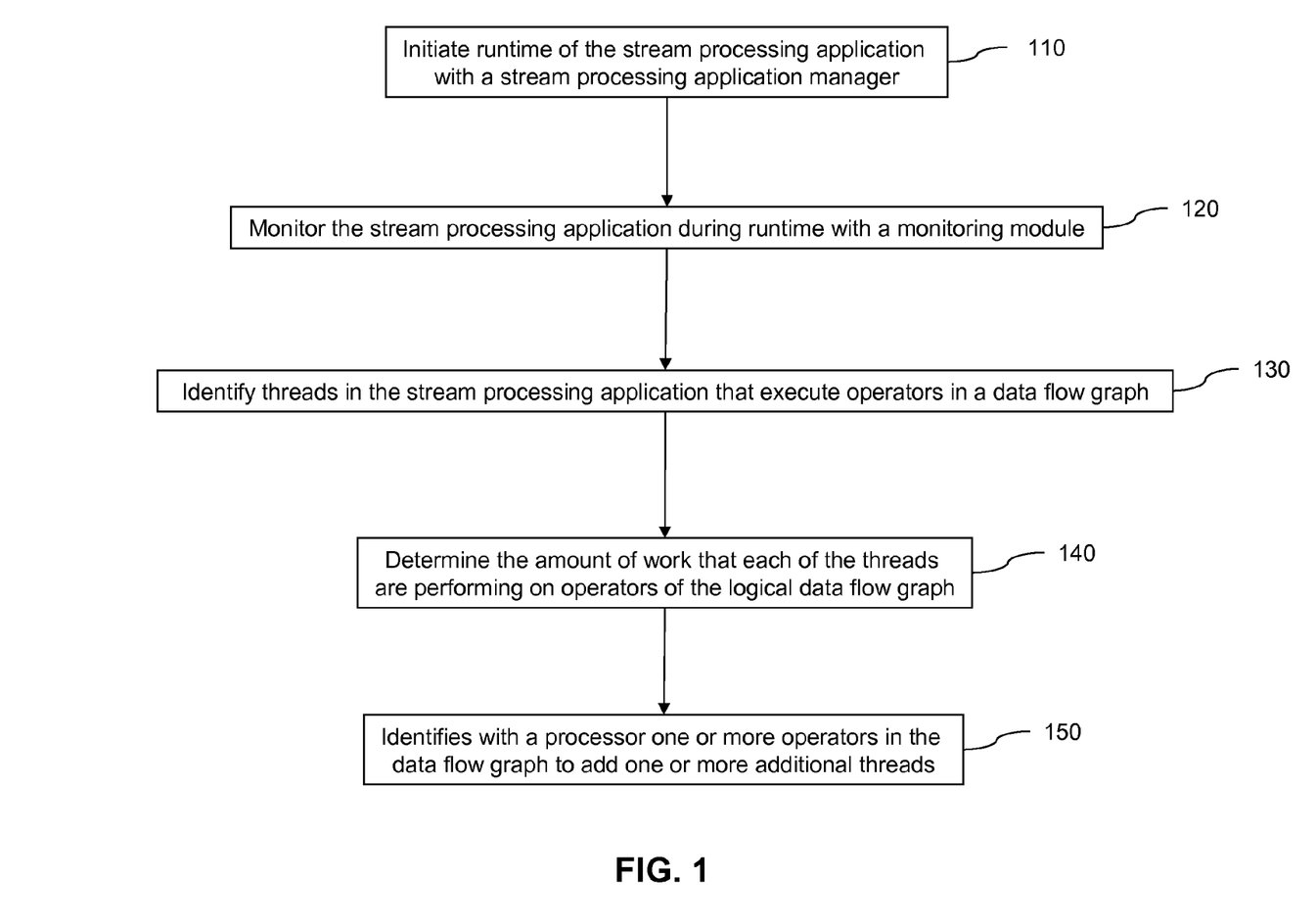
FIG. 1 is a flow diagram illustrating a method for adaptive auto-pipelining of a stream processing application according to an embodiment of the invention.

FIG. 1 is a flow diagram illustrating a method for adaptive auto-pipelining of a stream processing application according to an embodiment of the invention. Stream processing applications can be defined in terms of "operators" and "streams". Stream processing applications typically have many operators, which are the core logic of the stream processing application. Data items (also referred to herein as "tuples") are input into the operators. The operators perform processing with the data items and produce a result tuple. Operators can receive tuples in "streams", which are long sequences of many tuples. The results of operators can also be streams. In at least one embodiment, stream processing applications include operators connected by streams, wherein the operators only communicate with each other through the streams.

Runtime of the stream processing application is initiated with a stream processing application manager 110, wherein the stream processing application includes one or more threads. As used herein, the term "stream processing application manager" includes one or more hardware devices for initiating a stream processing application and adding or removing threads from the stream processing application. The handling of the execution of programs can be a primary responsibility of an operating system. A program in execution is called a "process". The operating system determines on which physical CPU cores a process should execute. By default, a process only uses one CPU core, because when a new process is started, the new process only has one "thread" of execution. However, a process can execute on multiple CPU cores by requesting that the operating system launch another thread for that process. The new thread can execute code in the already existing program; and, the new thread can execute in parallel (at the same time) as the original thread on a different CPU core.

Figure 2:
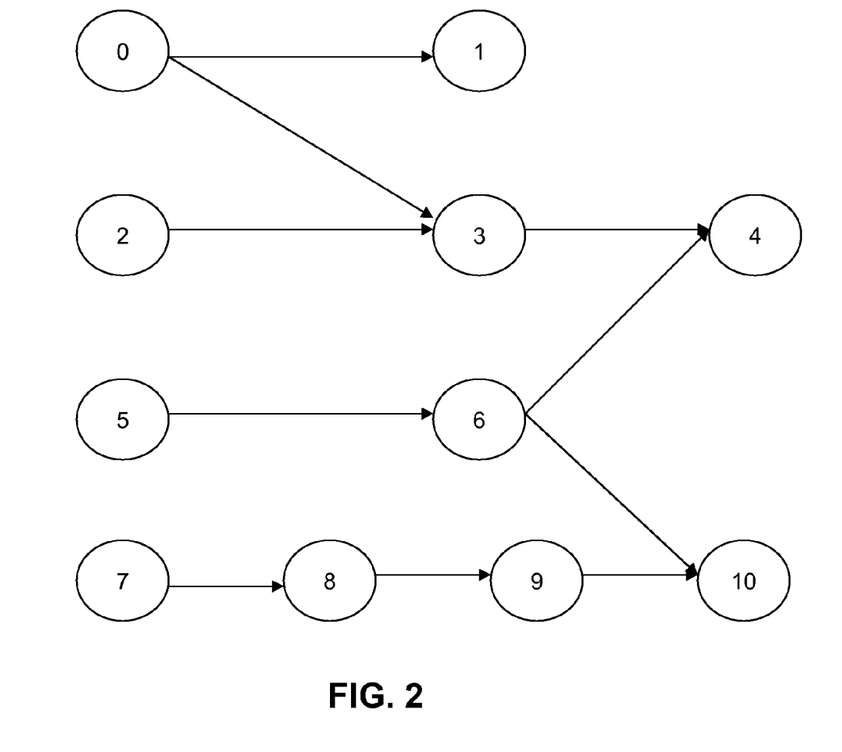
FIG. 2 illustrates a data flow graph according to an embodiment of the invention.

A monitoring module monitors the stream processing application during runtime 120. The monitoring module identifies threads in the stream processing application that execute operators (also referred to herein as "regions") in a data flow graph 122. A data flow graph is the logical representation of the operators. For example, as illustrated in FIG. 2, a data flow graph 200 includes operators 0-10. FIG. 2 illustrates a data flow graph according to an embodiment of the invention.

Figure 3:
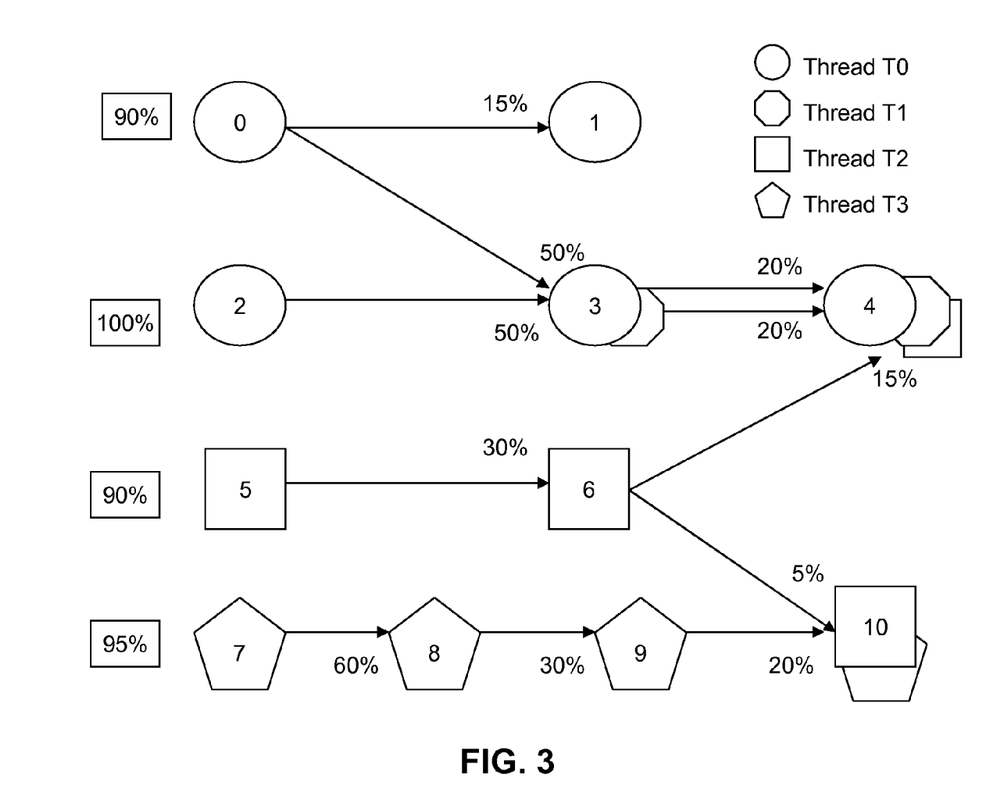
FIG. 3 illustrates a runtime operator graph according to an embodiment of the invention.

The monitoring module also determines the amount of work that each of the threads are performing on operators of the logical data flow graph 124. For example, FIG. 3 illustrates a runtime operator graph, where the data flow graph illustrated in FIG. 2 is annotated to illustrate how threads T0-T3 execute on the operators 1-10. In FIG. 3, operators that have the thread T0 executing on it are shown with an oval; operators that have the thread T1 executing on it are shown with an octagon; operators that have the thread T2 executing on it are shown with a square; and, operators that have the thread T3 executing on it are shown with a pentagon.

Specifically, in this example, the thread T0 is scheduled to execute on operators 0, 1, 3, and 4 ninety percent of the time that the stream processing application is running. Ten percent of the time that the stream processing application is running, the thread T0 is not scheduled to execute on operators 0, 1, 3, and 4. When the thread T0 is executing, the thread T0 executes on operator 1 fifteen percent of the time, on operator 3 or all downstream operators (i.e., operator 4) fifty percent of the time, on operator 4 twenty percent of the time, and on operator 0 thirty-five percent of the time (100%-15%-50%).

The thread T1 is scheduled to execute on operators 2, 3, and 4 one-hundred percent of the time that the stream processing application is running. The thread T1 executes on operator 3 or all downstream operators (i.e., operator 4) fifty percent of the time, on operator 4 twenty percent of the time, and on operator 2 fifty percent of the time (100%-50%).

The thread T2 is scheduled to execute on operators 5, 6, 4, and 10 ninety percent of the time that the stream processing application is running. Ten percent of the time that the stream processing application is running, the thread T2 is not scheduled to execute on operators 5, 6, 4, and 10. When the thread T2 is executing, the thread T2 executes on operator 6 or all downstream operators (i.e., operators 4 and 10) thirty percent of the time, on operator 4 fifteen percent of the time, on operator 10 five percent of the time, and on operator 5 seventy percent of the time (100%-30%).

The thread T3 is scheduled to execute on operators 7-10 ninety-five percent of the time that the stream processing application is running. Five percent of the time that the stream processing application is running, the thread T3 is not scheduled to execute on operators 7-10. When the thread T3 is executing, the thread T3 executes on operator 8 or all downstream operators (i.e., operators 9 and 10) sixty percent of the time, on operator 9 or all downstream operators (i.e., operator 10) thirty percent of the time, on operator 10 twenty percent of the time, and on operator 7 forty percent of the time (100%-60%).

Figure 4:
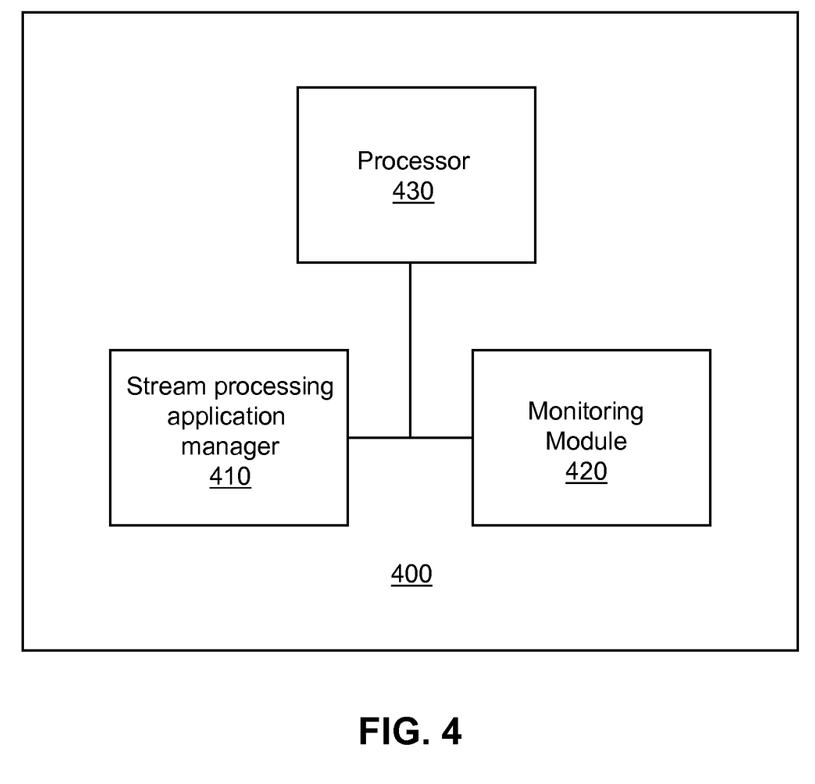
FIG. 4 illustrates a system for adaptive auto-pipelining of a stream processing application according to an embodiment of the invention.

A processor identifies one or more operators in the data flow graph to add one or more additional threads 130, wherein the addition of an additional thread is expected to improve performance. Specifically, the additional thread can receive at least a portion of the runtime workload from the thread(s) on the identified operator. As used herein, the term "processor" refers to a hardware device connected to the monitoring module. The processor identifies the operator(s) to add additional threads to based on the monitoring of the stream processing application during the runtime. In at least one embodiment, this includes identifying thread(s) on the identified operator that have a runtime workload above a threshold workload. For example, as illustrated in FIG. 4, both the thread T0 and T1 execute the operator 3 or the operator 4 fifty percent of the time. Both the thread T0 and T1 execute the operator 4 twenty percent of the time. If fifty percent is above a predetermined threshold workload (e.g., 49%), then the processor determines that one or more additional threads should be added to the operator 3.

The additional thread(s) are added to the identified operator(s) during the runtime of the stream processing application. At least a portion of the runtime workload can be allocated from the thread(s) on the identified operator to the additional thread(s). For example, if additional threads are added to the operator 3, runtime workload can be allocated from threads T0 and T1 to the new threads.

In at least one embodiment of the invention, the processor identifies one or more threads to remove from the stream processing application based on the monitoring of the stream processing application during runtime. The identified thread to remove may have a workload below a threshold workload. For example, if the threshold workload is 20%, then the thread T0 can be removed from the operator 1; and, the thread T2 can be removed from the operators 4 and 10.

The identified thread(s) to remove are removed during the runtime of the stream processing application. The threads can be added to and/or removed from the operators with the stream processing application manager. In at least one embodiment, workloads between the remaining threads in the stream processing application are within a threshold range of one another (e.g., 20%) after addition and/or removal of threads from the operators.

In at least one embodiment of the invention, the monitoring of the stream processing application further includes measuring performance of the stream processing application. The performance is measured to determine if a previous optimization process increased the performance of the stream processing application relative to a previous time period of execution of the stream processing application. The previous optimization step can include adding and/or removing one or more threads from the stream processing application. The previous optimization step can be reversed if the previous optimization step did not increase the performance of the stream processing application. This can include removing the added thread from the stream processing application and/or adding the removed thread back to the stream processing application.

FIG. 4 illustrates a system 400 for adaptive auto-pipelining of a stream processing application having one or more threads according to an embodiment of the invention. The system 400 includes a stream processing application manager 410 for initiating runtime of the stream processing application. A monitoring module 420 is connected to the stream processing application manager 410. As used herein, the term "connected" includes operationally connected, logically connected, in communication with, physically connected, engaged, coupled, contacts, linked, affixed, and attached.

The monitoring module 420 can be a hardware device connected to a server for monitoring the stream processing application during the runtime. The monitoring module 420 can monitor the stream processing application to identify threads in the stream processing application that execute operators in a data flow graph, and to determine the amount of work that each of the threads are performing on operators of the logical data flow graph.

A processor 430 is connected to the stream processing application manager 410 and/or monitoring module 420, wherein the processor 430 identifies one or more operators in the data flow graph to add one or more additional threads based on the monitoring of the stream processing application during the runtime. The stream processing application manager 410 can add the additional thread(s) to the identified operator(s) during the runtime. In at least one embodiment of the invention, the monitoring module 420 identifies one or more threads on the identified operator having a runtime workload above a threshold workload, wherein the additional thread(s) receive at least a portion of the runtime workload from the thread(s) on the identified operator.

In another embodiment, the monitoring module 420 measures the performance of the stream processing application to determine if a previous optimization process increased the performance of the stream processing application relative to a previous time period of execution of the stream processing application. The previous optimization step can include adding one or more threads to the stream processing application and/or removing one or more threads from the stream processing application. The stream processing application manager 410 can reverse the previous optimization step when the previous optimization step does not increase the performance of the stream processing application. The stream processing application manager 410 can remove the added thread from the stream processing application and/or add the removed thread to the stream processing application.

In at least one embodiment of the invention, the processor 430 identifies one or more threads to remove from the stream processing application based on the monitoring of the stream processing application during the runtime. he stream processing application manager can remove the identified thread(s) to remove during the runtime, wherein the identified thread(s) to remove can have a workload below a threshold workload.

In another embodiment, the stream processing application manager adds the additional thread(s) to the stream processing application during the runtime and/or removes one or more thread from the stream processing application during the runtime. The workloads between the remaining threads in the stream processing application after the addition and/or the removal can be within a threshold range of one another. The monitoring module 420 can determine with a predictive model an optimal location to insert the additional thread(s), such that the additional thread(s) receive workload from one or more threads on the identified operator to improve performance of the operator.

Another embodiment provides a system for adaptive auto-pipelining of a stream processing application including one or more threads. The system includes a stream processing application manager for initiating runtime of the stream processing application. A monitoring module is connected to the stream processing application manager, wherein the monitoring module monitors the stream processing application during the runtime. This is performed in order to identify threads in the stream processing application that execute operators in a data flow graph, and to determine the amount of work that each of the threads are performing on operators of the logical data flow graph.

A processor is connected to the stream processing application manager and/or the monitoring module. The processor identifies one or more threads to remove from the stream processing application based on the monitoring of the stream processing application during the runtime. The stream processing application manager can remove the identified thread(s) to remove during the runtime, wherein the identified thread stream processing application manager to remove have workloads below a threshold workload. Workloads between remaining threads in the stream processing application after the removing of the identified thread(s) to remove can be within a threshold range of one another.

In at least one embodiment, the monitoring module measures performance of the stream processing application to determine if a previous optimization process increased the performance of the stream processing application relative to a previous time period of execution of the stream processing application. The previous optimization step can include adding one or more threads to the stream processing application and/or removing one or more threads from the stream processing application. The processor can reverse the previous optimization step when the previous optimization step does not increase the performance of the stream processing application. The processor can remove the added thread from the stream processing application and/or add the removed thread to the stream processing application.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
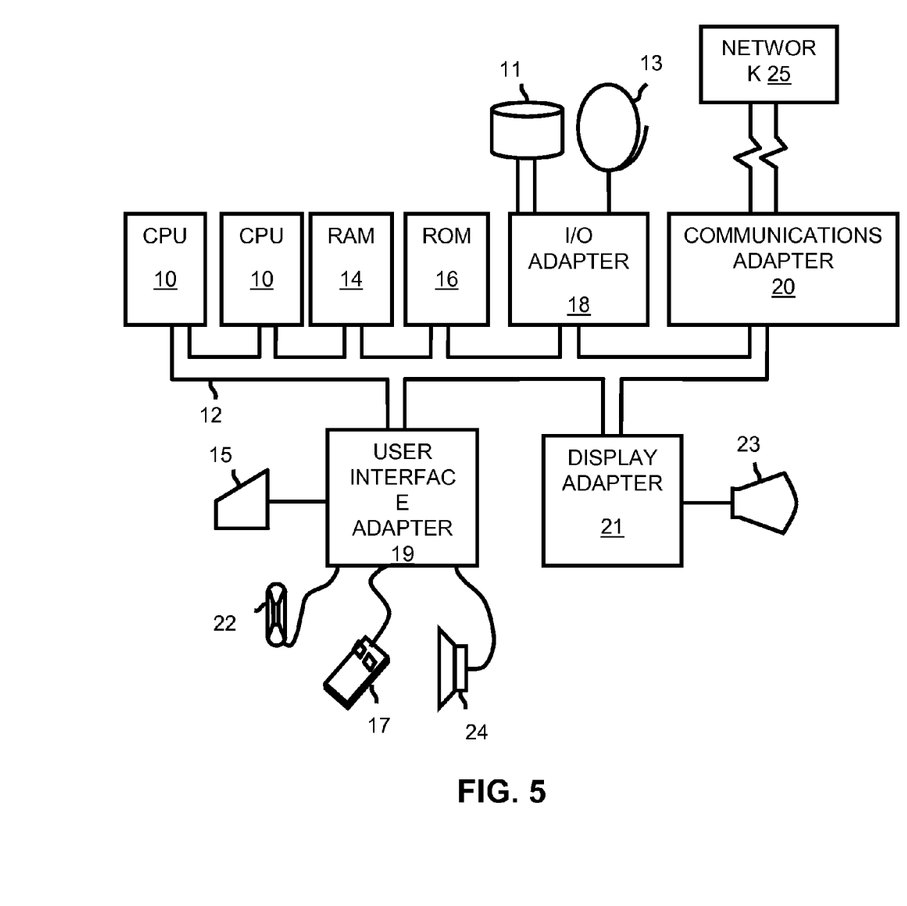
FIG. 5 illustrates a computer program product according to an embodiment of the invention.

Referring now to FIG. 5, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for adaptive auto-pipelining of a stream processing application having at least one thread, said system comprising:
    a monitoring module connected to said stream processing application manager, said monitoring module monitors the stream processing application during the runtime to:
        identify threads in the stream processing application that execute operators in a data flow graph,
        determine an amount of work that each of the threads are performing on operators of the logical data flow graph,
    wherein said monitoring module measures performance of the stream processing application to determine if a previous optimization process increased the performance of the stream processing application relative to a previous time period of execution of the stream processing application, the previous optimization step including at least one of adding at least one thread to the stream processing application and removing at least one thread from the stream processing application;
    a processor connected to said monitoring module, said processor identifies at least one operator in the data flow graph to add at least one additional thread based on the monitoring of the stream processing application during the runtime; and
    a stream processing application manager for initiating runtime of the stream processing application, wherein said stream processing application manager reverses the previous optimization step when the previous optimization step does not increase the performance of the stream processing application, wherein said stream processing application manager at least one of removes the added thread from the stream processing application and adds the removed thread to the stream processing application.

2. The system according to claim 1, wherein said stream processing application manager adds the at least one additional thread to the identified at least one operator during the runtime.

3. The system according to claim 1, wherein said monitoring module identifies at least one thread on the identified operator having a runtime workload above a threshold workload.

4. The system according to claim 3, wherein the at least one additional thread receives at least a portion of the runtime workload from the at least one thread on the identified operator.

5. The system according to claim 1, wherein said processor identifies at least one thread to remove from the stream processing application based on the monitoring of the stream processing application during the runtime, and
    wherein said stream processing application manager removes the identified at least one thread to remove during the runtime.

6. The system according to claim 5, wherein the identified at least one thread to remove has a workload below a threshold workload.

7. The system according to claim 1, wherein said stream processing application manager at least one of:
    adds the at least one additional thread to the stream processing application during the runtime; and
    removes at least one thread from the stream processing application during the runtime,
    wherein workloads between remaining threads in the stream processing application after at least one of the addition and the removal are within a threshold range of one another.

8. The system according to claim 1, wherein said monitoring module determines with a predictive model an optimal location to insert the at least one additional thread, such that the at least one additional thread receives workload from at least one thread on the identified operator to improve performance of the operator.

9. A system for adaptive auto-pipelining of a stream processing application including at least one thread, said system comprising:
    a stream processing application manager for initiating runtime of the stream processing application;
    a monitoring module connected to said stream processing application manager, said monitoring module monitors the stream processing application during the runtime to:
        identify threads in the stream processing application that execute operators in a data flow graph, and
        determine an amount of work that each of the threads are performing on operators of the logical data flow graph,
    wherein said monitoring module measures performance of the stream processing application to determine if a previous optimization process increased the performance of the stream processing application relative to a previous time period of execution of the stream processing application, the previous optimization step including at least one of adding at least one thread to the stream processing application and removing at least one thread from the stream processing application; and
    a processor connected to said monitoring module, said processor identifies at least one thread to remove from the stream processing application based on the monitoring of the stream processing application during the runtime, wherein said processor reverses the previous optimization step when the previous optimization step does not increase the performance of the stream processing application, and wherein said processor at least one of removes the added thread from the stream processing application and adds the removed thread to the stream processing application.

10. The system according to claim 9, wherein said stream processing application manager removes the identified at least one thread to remove during the runtime,
    wherein the identified at least one thread to remove has a workload below a threshold workload.

11. The system according to claim 9, wherein workloads between remaining threads in the stream processing application after the removing of the identified at least one thread to remove are within a threshold range of one another.

12. A system for adaptive auto-pipelining of a stream processing application having at least one thread, said system comprising:
    a stream processing application manager for initiating runtime of the stream processing application;

a monitoring module connected to said stream processing application manager, said monitoring module monitors the stream processing application during the runtime to:
  identify threads in the stream processing application that execute operators in a data flow graph,
  determine an amount of work that each of the threads are performing on operators of the logical data flow graph,
  measure performance of the stream processing application to determine if a previous optimization process increased the performance of the stream processing application relative to a previous time period of execution of the stream processing application, the previous optimization step including at least one of adding at least one thread to the stream processing application and removing at least one thread from the stream processing application; and
a processor connected to said monitoring module, said processor identifies, based on the monitoring of the stream processing application during the runtime, at least one of:
  an operator in the data flow graph to add at least one additional thread, and
  a thread to remove from the stream processing application.

13. The system according to claim 12, wherein said stream processing application manager at least one of:
  adds the at least one additional thread to the identified at least one operator during the runtime; and
  removes the identified at least one thread to remove during the runtime.

14. The system according to claim 13, wherein workloads between remaining threads in the stream processing application after at least one of the addition and the removal are within a threshold range of one another.

15. The system according to claim 12, wherein said monitoring module identifies at least one thread on the identified operator having a runtime workload above a threshold workload, and
  wherein the at least one additional thread receives at least a portion of the runtime workload from the at least one thread on the identified operator.

16. A computer program product for adaptive auto-pipelining of a stream processing application having at least one thread, said computer program product comprising:
  a computer readable storage medium;
  first program instructions to initiate runtime of the stream processing application;
  second program instructions to monitor the stream processing application during the runtime, said second program instructions:
    identify threads in the stream processing application that execute operators in a data flow graph, and
    determine an amount of work that each of the threads are performing on operators of the logical data flow graph, and
    measure performance of the stream processing application to determine if a previous optimization process increased the performance of the stream processing application relative to a previous time period of execution of the stream processing application, the previous optimization step including at least one of adding at least one thread to the stream processing application and removing at least one thread from the stream processing application;
  third program instructions to identify at least one operator in the data flow graph to add at least one additional thread based on the monitoring of the stream processing application during the runtime; and
  fourth program instructions to reverse the previous optimization step when the previous optimization step does not increase the performance of the stream processing application, wherein said fourth program instructions at least one of:
    removes the added thread from the stream processing application, and
    adds the removed thread to the stream processing application,
  wherein said first program instructions, said second program instructions, said third program instructions, and said fourth program instructions are stored on said computer readable storage medium.

* * * * *